March 30, 1954   W. G. AXTELL   2,673,630
LUGGAGE HANDLE
Filed June 28, 1951
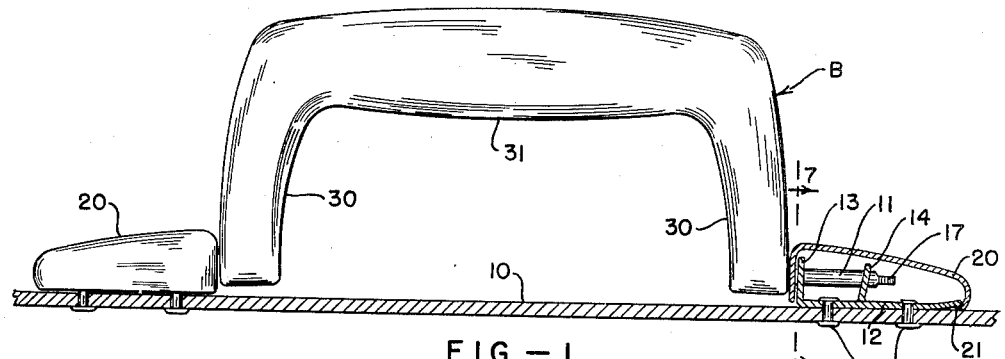
FIG.—1
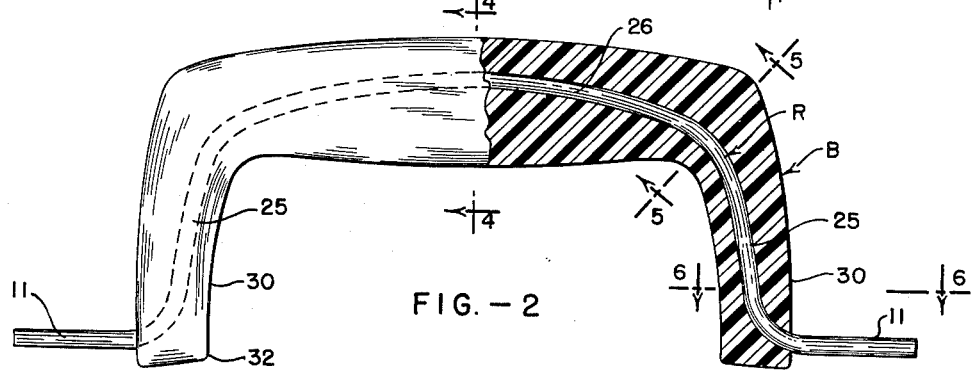
FIG.—2
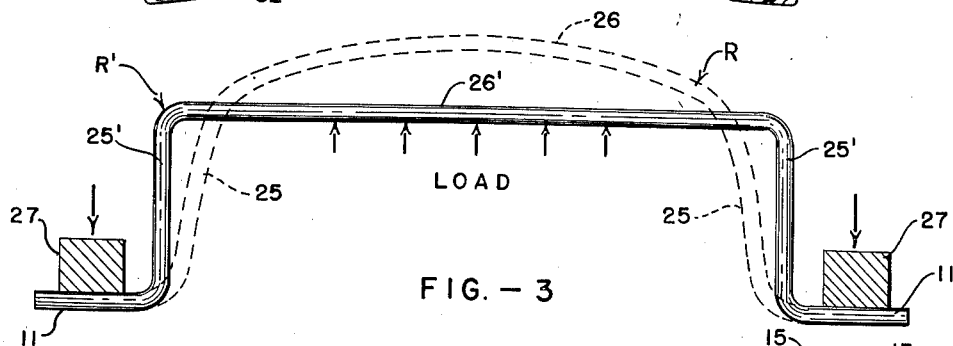
FIG.—3
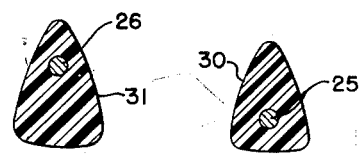
FIG.—4   FIG.—5
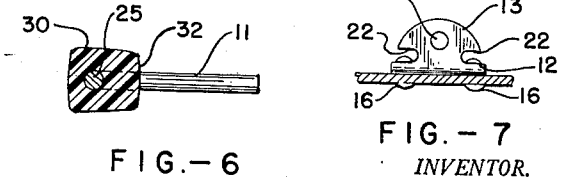
FIG.—6   FIG.—7
INVENTOR.
Willard G. Axtell
BY
Lamphere & Van Valkenburgh
ATTORNEYS Patented Mar. 30, 1954

2,673,630

UNITED STATES PATENT OFFICE 2,673,630

LUGGAGE HANDLE

Willard G. Axtell, Denver, Colo., assignor to Shwayder Bros., Inc., Denver, Colo., a corporation of Colorado Application June 28, 1951, Serial No. 233,959

5 Claims. (Cl. 190—57)

This invention relates to luggage handles, and more particularly to reinforced luggage handles formed of a molded, resilient, non-metallic material, such as rubber or synthetic resin.

Certain previous types of luggage handles formed of molded rubber have been reinforced by a rod core, extending centrally within the molded rubber and substantially rectangular in shape, i. e. having a straight top and straight sides generally perpendicular to the straight top. This type of handle has been manufactured extensively, but suffers from the defect that when a load is placed on the handle, such as when a user is carrying a heavily loaded case, the lower ends of the handle tend to be pulled together by a force of considerable magnitude. This produces difficulty in adequately maintaining the ends of the core in the hardware or means for attaching the handle to the case, in which the ends of the core also pivot. Such force tends to produce undue wear on the hardware and to cause the ends of the rod to pull inwardly from the hardware, with the possibility of deformation of the rod and impairment of the freedom of pivoting of the handle, as well as sufficient wear that the handle may come out completely from the hardware, thus eventually rendering it useless.

In an earlier construction, a wire core was surrounded by a body member formed of rubber or the like, with a leather sheath enclosing the rubber body member. Again, the shape of the wire core was substantially rectangular or semicircular, and the lower ends of the wire were provided with loops, adapted to encircle pivot pins extending laterally through the ends of the handle and the loops. Again, when loaded, the ends of the handle tended to pull inwardly with sufficient force that the pins tended to become loose and to be pulled out of the hardware.

Among the objects of the present invention are to provide a novel luggage handle; to provide such a handle which includes a body formed of resilient, non-metallic material, such as molded rubber, synthetic resin, or the like; to provide such a handle in which the molded body is reinforced by a metal rod extending therethrough; to provide such a handle in which the ends of the reinforcing rod may be used to connect the handle to the hardware of a luggage case or the like; to provide such a handle in which the tendency for inward movement of the lower ends of the handle, upon loading, is substantially or wholly prevented; and to provide such a handle which may be manufactured with relative ease and which will be durable and have a long life.

Additional objects and the novel features of this invention will become apparent from the following description, taken in connection with the accompanying drawings, in which:

Fig. 1 is a side elevation of a handle constructed in accordance with this invention, in upright position on a luggage case, only a portion of the latter being shown in section, and a cap of the hardware being in section for clarity of illustration;

Fig. 2 is a longitudinal section taken through the luggage handle of Fig. 1;

Fig. 3 is a diagram illustrating the manner in which the shape of a reinforcing rod of the luggage handle of Figs. 1 and 2 may be determined;

Figs. 4–6, inclusive, are enlarged cross sections respectively taken along lines 4—4, 5—5, and 6—6 of Fig. 2; and Fig. 7 is a fragmentary section taken along line 7—7 of Fig. 1.

As illustrated in Fig. 1, a luggage handle constructed in accordance with this invention may be mounted on a luggage case having a wall 10, which is shown in the drawing as being only a single layer, but may be a composite structure, such as metal or other reinforcement beneath an outer layer of leather, or a multi-layer plywood lined on the inside and covered on the outside with a wear resistant layer of a suitable plastic or the like. Or, the wall 10 may be a metal plate attached to the remainder of the case in a suitable manner. The handle of this invention may comprise a novel body B, formed of resilient material, such as rubber or a molded plastic, a plasticized polyvinyl chloride being suitable for the purpose, which is molded around a rod R, made of steel or other suitable metal, which is especially preformed in accordance with this invention to prevent force acting inwardly on the lower ends of the body B, when loaded, from moving the ends inwardly.

The ends 11 of the rod R extend laterally outwardly, in opposite directions, from the lower end of the handle and are adapted to form a pivotal connection with the hardware or similar means for attaching the same to the case wall 10. As in Fig. 1, the handle attachment hardware may comprise a bracket 12 having an upstanding ear 13 on the inner end and a second upstanding ear 14 struck from the central portion of the bracket, each of the ears 13 and 14 being provided with aligned holes, such as hole 15 of Fig. 7, through which an end 11 of the rod R extends. The bracket 12 may be attached to the wall 10 by rivets 16, or in any other suitable manner, while the extreme end 17 of the rod R may be flattened, as shown in Fig. 1, to prevent the handle from being removed in the event that the lower ends of the handle are deliberately pushed together. A cap 20 is adapted to cover the bracket 12, both for the sake of appearance and to prevent clothing or the like from catching on or beneath the hardware, the cap 20 (which along with the hardware pieces forms no part of the present invention) conveniently being a hollow shell formed with a lip on the underside of its outer end, which may be placed under the upturned outer end 21 of the bracket 12, and with indentations or a flange, adapted to snap under shoulders 22 on the inner ear 13, as shown in Fig. 7. The inner end of the cap 20 is also provided with a short slot, to permit the cap to pass over the rod R. As will be evident, the handle may be moved to any desired angular position, with respect to the case, by virtue of the pivoting action of the ends 11 of the rod R in the bracket 12, although it tends to be maintained in an upright position, in a manner explained later.

In accordance with this invention, the rod R is preformed so that when a load is applied to the handle, the ends 11 of the rod will tend to remain in position, and not be pulled inwardly toward each other. As in Fig. 2, the rod R is not formed rectangularly, but the sides 25 are inclined slightly toward each other and the top 26 of the rod is curved in a form somewhat similar to a parabola. The desired shape of the rod R may be determined by the test illustrated in Fig. 3, in which a substantially rectangular rod R', having vertical sides 25' and a straight top 26', as shown in full, is restrained from upward movement, as by blocks 27 restraining upward movement of ends 11, or by rollers or other means providing a surface beneath which the ends 11 may slide, but with the ends 11 free to move inwardly toward each other. A load in excess of the maximum load expected to be placed on the handle and preferably such that the elastic limit of the material will be approached, such as 300 to 400 pounds for a round rod of ⅛ in. diameter, is exerted against the straight top 26', as indicated by the arrows of Fig. 3, and while not necessarily uniformly distributed along the top 26', is preferably distributed therealong, such as for a distance of 1½ in. to each side of the center, when the straight top 26' is approximately 4 in. long, although the load may be concentrated at the center. The deformation of the rod R' produced by such loading causes the ends 11' to move inwardly, the sides 25' to be bent toward each other, and the top 26' to assume a curve, the shape assumed by the rod R' under load being indicated by the dotted rod R, which will be seen to have the same shape as the rod R of Fig. 2. It will be understood, of course, that in a test to determine the desired ultimate shape of the rod R, the rod R' is deformed and the shape of the rod R is determined by the shape of the rod R' under load. It should be pointed out that such shape is not determined by the shape assumed by the rod R' after the load is released, since the elasticity of the steel or other metal of which the rod is made will tend to bring it back to the shape R' after the load is released. However, in making the rod R, it is deliberately formed, as in a die, to the desired shape. This has been found to have the effect of permitting the rod R to be stressed to the maximum load before any tendency for deformation occurs, since the rod R already has the shape which it would have assumed if the maximum load were placed thereon.

The preferred preformed shape of the top 26 of the rod R is approximately or substantially a portion of a parabola, with the sides 25 tipped inwardly, and curved, rather than angular, portions joining the sides 25 and the top 26, and also the ends 11 and the sides 25. The curvature of the top 26 may be deduced as substantially parabolic by considering the top to be a simple beam supported at the ends and subjected to a single load at the center, or a uniformly distributed load.

The stiffness of a beam is determined by the following formulae:

$$M = EI \, d^2f/dx^2$$

where:

$M$ = Moment of force
$E$ = Moment of inertia of section
$I$ = Modulus of elasticity of material
$f$ = Deflection at any point
$x$ = Distance from the support and $$M\,dx = EI\left(\frac{df}{dx} + C\right)$$

For a simple beam supported at its ends and loaded at the center:

$$M_x = \frac{Wx}{2}$$

where $W$ = total load then $$\frac{Wx\,dx}{2} = \frac{Wx^2}{4} + C'$$

and $$\frac{Wx^2}{2} + C' = EI\left(\frac{df}{dx} + C\right)$$

or $$\frac{df}{dx} = \frac{Wx^2}{2EI} + \frac{C'}{EI} - C$$

and $$f = \int\left(\frac{Wx^2}{2EI} + \frac{C'}{EI} - C\right)dx$$

$$f = \frac{Wx^2\,dx}{2EI} + \frac{C'\,dx}{EI} - C\,dx$$

$$f = \frac{Wx^3}{6EI} + \frac{C'x}{EI} - Cx + C''$$

$$f = \frac{Wx^3}{6EI} + x\left(\frac{C'}{EI} - C\right) + C''$$

Since $f = 0$ when $x = 0$, and $dx = 0$ when $x = 0$, the constant of integration $C''$ equals zero, and also $C' = CEI$, so that the terms involving $C$ and $C'$ cancel out. Thus, the equation becomes:

$$f = \frac{Wx^3}{6EI}$$

The above equation will be recognized as defining a cubic parabola, and a similar equation will be obtained for a beam uniformly loaded, since in such case:

$$M_x = \frac{wx}{2}(L-x)$$

where $w$ is the unit load and $$\frac{wx}{2}(L-x)dx = \frac{wLx^2}{4} - \frac{wx^3}{6} + C' = \frac{Wx^2}{4} - \frac{Wx^3}{6} + C'$$

since $wL = W$.

Also, the final equation resulting is:

$$f = \frac{5Wx^3}{48EI}$$

It will be recognized, of course, that the actual deformation may differ from the curves plotted exactly in accordance with the above formulae, because the support is not exactly at the ends of the top 26' of rod R', but at the ends 11. However, when the load is first applied, the sides 25' will be in substantially pure tension, and until bent inwardly by the shortening of the distance between the tops of the sides 25' by deformation of the top 26', the deformation will follow the curves of the above equations. In any event, it will be recognized that the deformation curve will approximate the curves of the above equations and will thus be at least approximately a portion of a cubic parabola.

After the rod has been preformed to its desired shape, the body B is molded therearound, as by placing the rod R in a mold, insuring that it will remain in the desired position, as by clamping the extending ends 11, and pouring plastic powder into the mold, and then compressing, if compression molding is used, or injecting the plastic under pressure into the mold, if injection molding is used. After the pressure has been maintained for a sufficient period of time, in accordance with conventional practice, the molded body may be removed and heated to set the resin, or it may be heated while still in the mold.

The body B comprises ends 30 and a top 31, the top 31 preferably having a generally triangular cross section, being greater in depth at the center and lesser in depth toward the ends, as will be evident from Figs. 2, 4 and 5, with an apex upward, i. e. the base of the triangle at the bottom. Also, each of the corners or apices is preferably rounded, with a greater radius of curvature at the lower apices and a lesser radius of curvature at the upper apex. It will be observed that, instead of extending substantially centrally through the ends 30 and the top 31 of the body B, the rod R enters each end 30 and extends diagonally across the same, being disposed substantially centrally of the body B at the upper corners, as shown in Fig. 5, but is disposed adjacent the top of the body at the center, as shown in Fig. 4. As will be evident from Fig. 4, the position of the rod adjacent the top of an inverted triangular section causes a greater amount of resilient material to be disposed between the lower edge, which rests in the hand, and the rod R, which, of course, carries the weight of the case. Also, the substantially triangular section, with the base of the triangle at the bottom, permits the handle to be tipped to one side or the other, and substantially the same amount of resilient material interposed between the hand and the load supporting rod R. This results not only in greater comfort to the user, because of the additional material between the hand and the load supporting rod R, but also produces a longer life of the handle, since the rod R is considerably less likely to wear through the body B, because of the greater amount of material beneath the rod R, particularly along the center of the top 26, than if the rod extended centrally through the top of the handle body. Furthermore, the generally triangular configuration of the top 31 of the body B, with the base of the triangle at the bottom, permits the normal user to carry the case with greater ease, a majority of whom can carry the case with greatest ease by letting the handle rest on the second joints of the fingers adjacent the palm, so that the fingers can close toward the palm, thus permitting the handle to be grasped more comfortably.

The ends 30 of the body B may be triangular, round, oval, square or substantially rectangular in cross section, the preferred cross-sectional shape being substantially triangular, corresponding to Fig. 5, for a major portion thereof, and merging into a substantially rectangular cross section at the bottom, such as in Fig. 6. In addition, the inside and outside of each end 30 of the body B may be slightly curved with a generally flat portion 32 on the outside at the bottom to correspond to the inner end of cap 20.

It will be understood, of course, that the preformed reinforcing rod R may be utilized with other shapes of molded handles, although a handle having a generally triangular section across the top is preferred for use with the rod R. It will further be understood that a body having a top with the cross sectional shape described above may be used with other reinforcing rods, although the preformed rod of this invention is again preferred. It will also be understood that the rod R need not be circular in cross section, since other cross sectional shapes, such as oval, square, rectangular or the like may be utilized, although a circular cross section is preferred, at least for the ends 11, to permit a pivoting action of the ends 11 in the preferably circular holes 15 in the attachment hardware. It will further be understood that the body B and/or rod R may be made of other materials, and that the handle may be attached to the case in any other desired manner.

While a specific embodiment of this invention has been illustrated and described, and certain variations therein indicated, it will be understood that other variations are possible, and that other embodiments of this invention may exist, without departing from the spirit and scope thereof.

What is claimed is:

1. A handle for luggage comprising a metal reinforcing rod having an upwardly curved top, integral sides joining said top and slanting inwardly toward said top, and integral ends extending laterally from the lower ends of said sides, said rod having a shape corresponding to the shape assumed under load by a test rod of the same material and having the same cross-sectional shape, said test rod having an initially straight top, initially straight sides initially extending substantially perpendicularly to said straight top, and ends extending laterally outwardly and initially substantially perpendicularly to said sides, said test rod ends for loading being restrained from upward movement but being free to move inwardly and said load being exerted upwardly against said initially straight top and at least equalling the normal maximum load to be placed on said handle rod; and a body of resilient, non-metallic material enclosing said rod, said body having ends enclosing said rod sides and a top enclosing said handle rod top, with said rod ends extending laterally from the lower portions of said body ends.

2. A handle for luggage comprising a metal reinforcing rod having an upwardly curved top, integral sides joining said top and slanting inwardly toward said top, and integral ends extending laterally from the lower ends of said sides, said rod having a shape corresponding to the shape assumed under load by a test rod of comparable size and material but having an initially straight top, initially straight sides initially extending substantially perpendicularly to said straight top, and ends extending laterally outwardly and initially substantially perpendicularly to said sides, said test rod ends for loading being restrained from upward movement but being free to move inwardly and said load being exerted upwardly against said initially straight top and at least equalling the normal maximum load to be placed on said handle rod; and a molded body of resilient, non-metallic material enclosing said rod, said body having ends enclosing said rod sides and a top enclosing said rod top, said body top having an upwardly pointed, generally triangular cross section of greater depth at the center than adjacent said ends and said rod ends extending laterally from the lower portions of said body ends.

3. A handle for luggage comprising a metal reinforcing rod having an upwardly curved top, integral sides joining said top and integral ends extending laterally from the lower ends of said sides; and a molded body of resilient, non-metallic material enclosing said rod, said body having ends enclosing said rod sides and a top enclosing said rod top, said reinforcing rod at the center of said body top being relatively closely adjacent the upper edge thereof and relatively closely adjacent the lower edge thereof at the ends of said body top, and said rod ends extending laterally from the lower portions of said body ends.

4. A handle for luggage comprising a metal reinforcing rod enclosed by a molded body of resilient, non-metallic material, said body having a laterally extending top whose cross section is triangular with an apex upward and each apex rounded with a lesser radius of curvature at the upward apex, the depth of said top at the center being greater than the depth at the ends, and said body having downwardly extending ends joining said top with the upper portion of each end being similarly triangular with rounded apices but the lower portion of each end being generally rectangular in cross section with the outer and inner edges curved.

5. A handle for luggage comprising a metal reinforcing rod having an upwardly curved top, integral sides joining said top and slanting inwardly toward said top, and integral ends extending laterally from the lower ends of said sides, said rod having a shape corresponding to the shape assumed under load by a test rod of comparable size and material but having an initially straight top, initially straight sides initially extending substantially perpendicularly to said straight top, and ends extending laterally outwardly and initially substantially perpendicularly to said sides, said test rod ends for loading being restrained from upward movement but being free to move inwardly and said load being exerted upwardly against said initially straight top and at least equalling the normal maximum load to be placed on said handle rod; and a molded body of resilient, non-metallic material enclosing said rod, said body having ends enclosing said rod sides and a top enclosing said rod top, said body top having a cross section which is triangular with an apex upward and each apex rounded with a lesser radius of curvature at the upward apex, the depth of said top at the center being greater than the depth at the ends, and said body having downwardly extending ends joining said top with the upper portion of each end being similarly triangular with rounded apices but the lower portion of each end being generally rectangular in cross section with the outer and inner edges curved, said rod top being relatively close to said upward apex of said body top at the center of the latter, and said rod ends extending laterally from the lower, generally rectangular cross section, portion of said body ends.

WILLARD G. AXTELL.

References Cited in the file of this patent
UNITED STATES PATENTS

| Number | Name | Date |
|---|---|---|
| 933,936 | Waldschmitt | Sept. 14, 1909 |
| 1,357,554 | Goldbaum | Nov. 2, 1920 |
| 1,667,567 | Shwayder | Apr. 24, 1928 |
| 1,774,949 | Shwayder | Sept. 2, 1930 |
| 2,517,369 | Wolfson | Apr. 1, 1950 |